Figure 1:
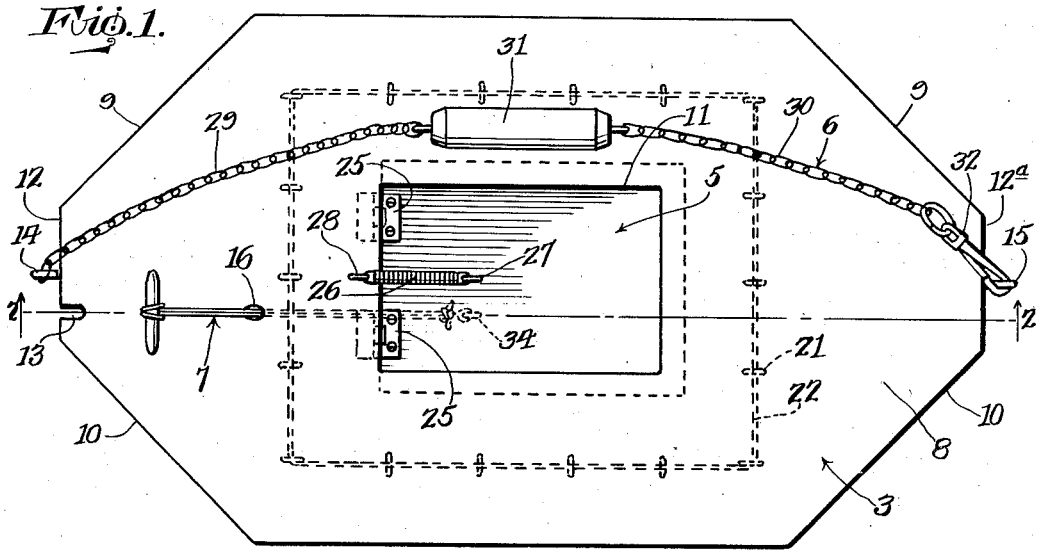

Feb. 11, 1936.  O. HORN  2,030,793

FISH BAG OR HOLDER

Filed May 8, 1935

Inventor
Otto Horn

Geo. S. Kimmel
Attorney

Patented Feb. 11, 1936

2,030,793

UNITED STATES PATENT OFFICE 2,030,793

FISH BAG OR HOLDER

Otto Horn, Ionia, Mich.

Application May 8, 1935, Serial No. 20,465

8 Claims. (Cl. 43—55)

My invention relates to a fish bag or holder.

The essential object of my invention is to provide, in a manner as hereinafter set forth, a normally closed buoyant fish bag or holder capable of being readily attached to a boat to be trailed from the latter and conveniently opened when desired for the slipping of the fish therein in the same manner as they are dropped into a creel or when it is desired to remove or dump the fish therefrom.

A further object of my invention is to provide, in a manner as hereinafter set forth, a fish bag or holder for the purpose referred to having as an element thereof a combined tow line and handle forming element.

A further object of my invention is to provide, in a manner as hereinafter set forth, a fish bag or holder for the purpose referred to capable of being employed as a live box when desired.

A further object of my invention is to provide, in a manner as hereinafter set forth, a fish bag or holder for the purpose referred to including a spring controlled trap door for normally closing it and with the door capable of being conveniently opened and latched in open position to permit of readily removing the fish by dumping or otherwise.

Further objects of my invention are to provide, in a manner as hereinafter set forth, a fish bag or holder for the purpose referred to which is simple in its construction and arrangement, strong, durable, compact, readily assembled, thoroughly efficient in its use, expeditiously opened for the slipping of fish therein, normally closed, conveniently dumped of its contents when desired and inexpensive to manufacture.

With the foregoing and other objects which may hereinafter appear, my invention consists of such parts, and such combination of parts as are hereinafter more specifically described and as are illustrated in the accompanying drawing, wherein is shown the preferred embodiment of my invention, but it is to be understood that changes, variations and modifications may be resorted to which fall within the scope of the invention as claimed.

Figure 2:
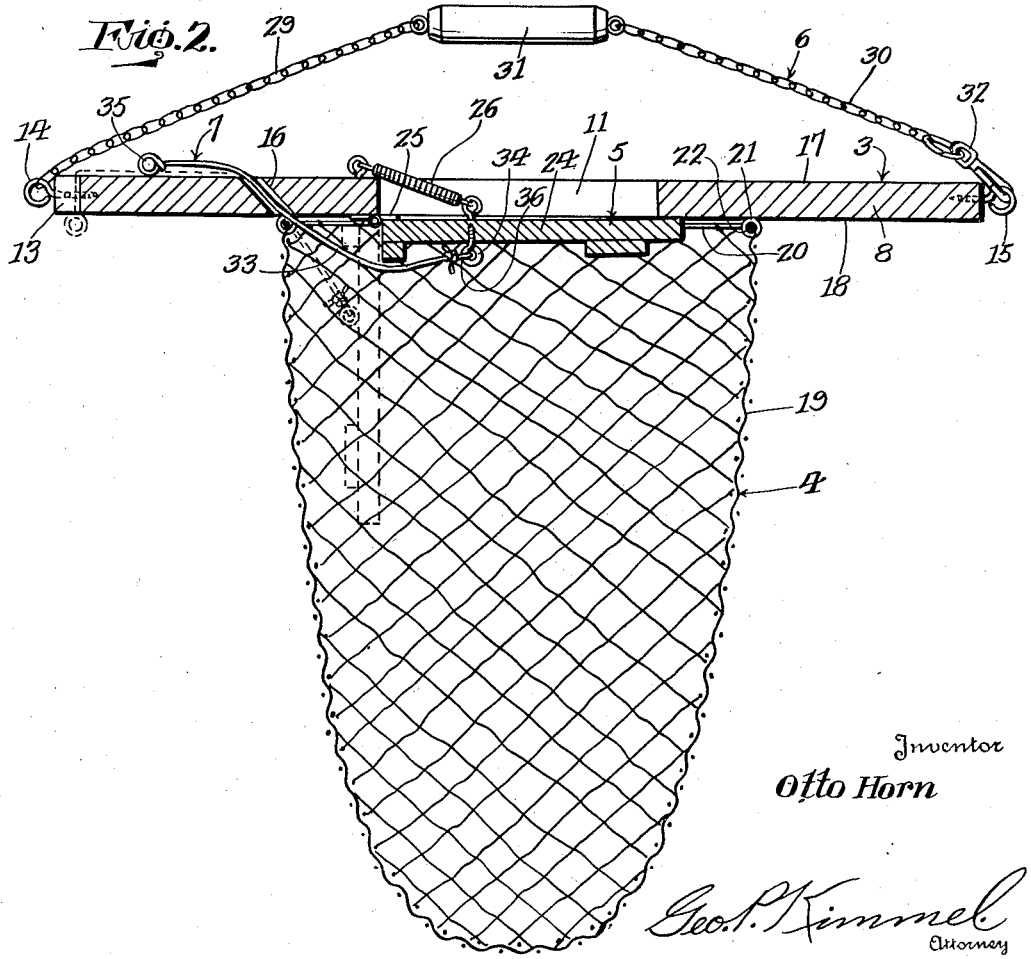

In the drawing:

Figure 1 is a top plan view of the fish bag or holder and illustrating it closed, and Figure 2 is a vertical sectional view of the fish bag or holder illustrating the trap door, in full lines closed and in dotted lines the trap door latched in open position.

The fish bag or holder includes a carrier or suspension element 3, a fish container element 4, a spring controlled closure element 5 for the element 4, a combined tow line and handle element 6 and a flexible, latchable opening element 7 for the closure element 5.

The element 3 constitutes a float and is formed from any suitable material which will provide for its floating on the water. Preferably, the material will be wood. The element 3 comprises a slab 8 of suitable thickness and width formed at each end with oppositely inclined corner edges 9, 10. The slab 8 is provided with a centrally arranged rectangular opening 11 which has its longitudinal and transverse medians on the like medians of the slab. The opening 11 forms a combined inlet and outlet for the element 4. The slab 8, at its end edge 12, is formed with a notch 13 and an outwardly directed eye 14. The slab 8 has extending from its other end edge 12ª an outwardly directed eye 15. The slab 8, between one end wall of opening 11 and its end eye 12, is provided with a channel 16 opening at the upper and lower faces 17, 18 respectively of the slab and extending at an outward inclination from the said lower face 18 to the said upper face 17.

The element 4 is formed of a lattice-like, reticulated or open mesh-like flexible body 19 of baglike form having its mouth end 20 positioned to oppose the face 18 of slab 8. The said mouth end 20 is of rectangular contour and encompasses, in spaced relation, the inner end of the walls of the opening 11. The mouth end 20 of body 19 is secured to the lower face 18 of slab 8 by a series of closely arranged holdfast devices 21 through which extend a coupling member 22 threaded through the body 19 at the mouth end 20 of the latter. The member 22 provides the mouth end of body 19 with an endless edge.

The element 5 is in the form of a trap door 24, preferably constructed of wood, and of greater length and width than that of opening 11. The door 24 is arranged to oppose face 18 of slab 8. One end of door 24 is flush with an end wall of opening 11. The door moves inwardly to open and outwardly towards and abuts face 18 of slab 8 to close opening 11. The door 24 is hinged at that end thereto which is flush with one end wall of opening 11 by a pair of spaced parallel hinges 25 which are secured to face 18 of slab 8 and the upper face of the door. A controlling spring is employed for normally maintaining the door in closed relation with respect to opening 11. The pressure of the water also assists in holding the door closed. The controlling spring is indicated at 26 and it is connected at one end, as at 27, to the upper face of door 24 and at its other end, as at 28, to the face 17 of slab 8.

The element 6 comprises a pair of flexible sections 29, 30 having their inner ends connected to the ends of a handle or grip 31. The outer end of section 29 is permanently attached to the eye 14. The outer end of the section 30 permanently carries a spring controlled hook 32 for detachable connection with the eye 15 or with the stern of a boat. When element 6 is in the position shown in Figure 1 it constitutes a handle and bail for the bag or holder, and when it is detached from eye 15 and connected to the boat it constitutes a tow line for the purpose of the bag or holder trailing the boat.

The element 7 comprises a flexible pull member 33, an eye 34 and a handle piece 35. The eye 34 is secured to and depends from the door 24. The inner end of member 33 is coupled, as at 36, to the eye 34. The member 33 extends outwardly and upwardly through channel 16. The handle piece 38 is attached to the outer end of member 33 and also constitutes a latching member which coacts with element 3 for latching the door 24 in open position, as illustrated by the dotted line showing, Figure 2. When door 24 is latched, the member 33 is extended downwardly through notch 13 in slab 8. The latching of door 24 is had against the action of the controlling spring 26 whereby when the door is released it will automatically move to shut position.

What I claim is:

1. A fish bag comprising a float formed with an opening and a channel, a mesh-like container of bag-like form having its mouth end attached to the float and surrounding said opening, a spring controlled door hinged to the float shiftable within the container and normally closing the door, a latchable pull member for and attached to the door for opening the latter and extending outwardly through said channel, and a combined tow line and handle element permanently attached at one end to and provided with means for detachably connecting its other end to the float.

2. A fish bag comprising a float formed with an opening and a channel, a mesh-like container of bag-like form having its mouth end attached to the float and surrounding said opening, a spring controlled door hinged to the float shiftable within the container and normally closing the door, a latchable pull member for and attached to the door for opening the latter and extending outwardly through said channel, and a combined tow line and handle element permanently attached at one end to and provided with means for detachably connecting its other end to the float, said pull member and float having coacting means for latching the pull member to maintain the door open.

3. A fish bag comprising a buoyant structure including a flexible skeleton container portion of bag-like form, a combined intake and outlet for the mouth end of said portion and a shiftable spring controlled door for normally closing said mouth end, and a combined tow line and handle element for said structure, said structure and element having coacting means for permanently connecting one end of said element to said structure, and said structure and element having coacting means for detchably connecting the other end of said element to said structure.

4. A fish bag comprising a buoyant structure including a flexible skeleton container portion of bag-like form, a combined intake and outlet for the mouth end of said portion and a shiftable spring controlled door for normally closing said mouth end, a combined tow line and handle element for said structure, said structure and element having coacting means for permanently connecting one end of said element to said structure, said structure and element having coacting means for detachably connecting the other end of said element to said structure, a pull member for opening the door, and said structure and member having coacting means for latching the pull member to hold the door open.

5. A fish bag comprising a flat buoyant slab having a central opening, a skeleton flexible container of bag-like form having its mouth edge attached to the inner face of and surrounding said opening, the latter providing a combined intake and outlet for said container, a spring controlled door hinged to the slab normally closing said opening, a pull member for opening the door, and a combined tow line and handle element attached to the slab.

6. A fish bag comprising a flat buoyant slab having a central opening, a skeleton flexible container of bag-like form having its mouth edge attached to the inner face of and surrounding said opening, the latter providing a combined intake and outlet for said container, a spring controlled door hinged to the slab normally closing said opening, a pull member for opening the door, and a combined tow line and handle element attached to the slab, said slab and pull member having coacting means for latching the door in open position.

7. A fish bag comprising a flat buoyant slab having a central opening, a skeleton flexible container of bag-like form having its mouth edge attached to the inner face of and surrounding said opening, the latter providing a combined intake and outlet for said container, a spring controlled door hinged to the slab normally closing said opening, said door arranged in said container, a pull member for and attached to the door, said member having a part arranged in the container, a part extending through the slab and a part disposed above the slab, a combined tow line and handle element, said slab and element having coacting means for permanently connecting one end of said element to one end of the slab, and said slab and element having coacting means for detachably connecting the other end of said element to the other end of the slab.

8. A fish bag comprising a flat buoyant slab having a central opening, a skeleton flexible container of bag-like form having its mouth edge attached to the inner face of and surrounding said opening, the latter providing a combined intake and outlet for said container, a spring controlled door hinged to the slab normally closing said opening, said door arranged in said container, a pull member for and attached to the door, said member having a part arranged in the container, a part extending through the slab and a part disposed above the slab, a combined tow line and handle element, said slab and element having coacting means for permanently connecting one end of said element to one end of the slab, said slab and element having coacting means for detachably connecting the other end of said element to the other end of the slab, and coacting means at one end of the slab and the outer end of said member for latching the door open.

OTTO HORN.